US006958181B1

(12) United States Patent
Gore

(10) Patent No.: US 6,958,181 B1
(45) Date of Patent: Oct. 25, 2005

(54) PROTECTED ACTIVATORS FOR USE IN LEUCO DYE COMPOSITIONS

(75) Inventor: Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 47 days.

(21) Appl. No.: 10/656,735

(22) Filed: Sep. 5, 2003

(51) Int. Cl.$^7$ .................................................. B32B 3/02
(52) U.S. Cl. .................... 428/64.1; 428/64.4; 428/64.8; 430/270.11; 503/212; 503/216
(58) Field of Search ............................... 428/64.1, 64.4, 428/64.8, 913; 430/270.11, 495.1, 945.1; 503/212, 216, 218, 225

(56) References Cited

U.S. PATENT DOCUMENTS

| 3,658,543 | A | | 4/1972 | Gerlach, Jr. et al. | |
|---|---|---|---|---|---|
| 3,767,449 | A | * | 10/1973 | Hayashi et al. | 428/323 |
| 3,900,218 | A | * | 8/1975 | Miyamoto et al. | 503/205 |
| 4,894,312 | A | | 1/1990 | Ohst et al. | |
| 5,322,831 | A | | 6/1994 | Minami et al. | |
| 5,424,475 | A | | 6/1995 | Boggs et al. | |
| 5,482,913 | A | | 1/1996 | Satake et al. | |
| 5,492,804 | A | | 2/1996 | Biavasco et al. | |
| 5,536,622 | A | | 7/1996 | Simpson et al. | |
| 5,672,560 | A | * | 9/1997 | Rush | 503/209 |
| 6,251,571 | B1 | | 6/2001 | Dessauer et al. | |
| 6,329,035 | B1 | * | 12/2001 | Iwasaki et al. | 428/64.1 |
| 6,528,230 | B1 | | 3/2003 | Takashima et al. | |
| 6,660,452 | B2 | * | 12/2003 | Iwasaki et al. | 430/270.13 |
| 2003/0108708 | A1 | * | 6/2003 | Anderson et al. | 428/64.4 |
| 2004/0146812 | A1 | * | 7/2004 | Gore et al. | 430/343 |
| 2004/0213922 | A1 | * | 10/2004 | Abrams et al. | 427/596 |
| 2004/0219327 | A1 | * | 11/2004 | Matsuishi et al. | 428/64.4 |

FOREIGN PATENT DOCUMENTS

| EP | 0 381 192 A1 | 8/1990 |
|---|---|---|
| EP | 0 659 583 A1 | 6/1995 |
| EP | 0 739 748 | 3/1999 |
| EP | 1 398 169 A1 | 3/2004 |
| JP | 1986-068925 | 2/1986 |
| JP | 1987-002974 | 11/1986 |
| JP | 1995-389670 | 10/1995 |
| WO | WO 81/01755 | 6/1981 |
| WO | WO 02/49010 A2 | 6/2002 |
| WO | WO 2004/067289 A1 | 8/2004 |

* cited by examiner

*Primary Examiner*—Elizabeth Mulvaney

(57) ABSTRACT

Compositions and methods for production of color images using leuco dye-containing color forming compositions are described. The color forming composition can include a color forming leuco dye, an activator having at least one acid group which can be protected by a protection leaving group; and a deprotecting agent configured for removing the protection leaving group upon application of energy in the form of heat or light.

33 Claims, No Drawings

PROTECTED ACTIVATORS FOR USE IN LEUCO DYE COMPOSITIONS

FIELD OF THE INVENTION

The present invention relates generally to leuco dye compositions. More particularly, the present invention relates to leuco dye compositions for use in forming color images.

BACKGROUND OF THE INVENTION

Compositions which produce a color change upon exposure to light or heat are of great interest in producing images on a variety of substrates. Optical disks represent a significant percentage of the market for data storage of software as well as of photographic, video, and/or audio data. Typically, optical disks have data patterns embedded thereon that can be read from one side of the disk, and a graphic display printed on the other side of the disk.

In order to identify the contents of the optical disk, printed patterns or graphic display information can be provided on the non-data side of the disk. The patterns or graphic display can be both decorative and provide pertinent information about the data content of the disk. In the past, commercial labeling has been routinely accomplished using screen-printing methods. While this method can provide a wide variety of label content, it tends to be cost ineffective for production of less than about 400 disks because of the fixed costs associated with preparing a stencil or combination of stencils and printing the desired pattern or graphic display.

In recent years, the significant increase in the use of optical disks for data storage by consumers has increased the demand to provide customized labels to reflect the content of the optical disk. Most consumer available methods of labeling are limited to either handwritten descriptions or pre-printed labels which may be affixed to the disk, but which can also adversely affect the disk performance upon spinning at high speeds.

Recently, a variety of leuco dye-containing compositions have been investigated for use on optical disks and other substrates. Typical leuco dye compositions include a leuco dye along with an activator. However, many of these compositions are insufficiently stable under ambient light conditions for practical use. However, the need still exists for improved leuco dye compositions which have improved stability, image forming, and developing characteristics.

SUMMARY OF THE INVENTION

It has been recognized that it would be advantageous to provide rapidly developable and light stable color forming compositions which are suitable for use in labeling substrates.

In one aspect of the present invention, a color forming composition can comprise a color forming leuco dye, an activator having at least one acid group which can be protected by a protection leaving group to form a protected activator, and a deprotecting agent for removing the protection leaving group upon application of energy.

In another aspect of the present invention, a method of forming color images on a substrate can comprise applying a color forming composition onto a substrate. The color forming composition can include a color forming leuco dye, an activator having at least one acid group which can be protected by a protection leaving group, and a deprotecting agent for removing the protection leaving group upon application of energy. Energy can then be applied to the color forming composition sufficient to activate the deprotecting agent to thereby remove the protection leaving group, but below the energy required for decomposition of the color forming composition.

Additional features and advantages of the invention will be apparent from the detailed description which follows, which illustrates, by way of example, features of the invention.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a leuco dye" includes reference to one or more of such materials.

As used herein, the term "color forming composition" typically includes a leuco dye, an activator having a protection leaving group, and a deprotecting agent. These three components can work together, upon exposure to heat, to provide color to the leuco dye.

As used herein, "leuco dye" refers to a dye which, prior to development, is in a leuco form which is substantially colorless or white, and which reacts with an activator upon exposure to energy in the form of heat or light to form a colored dye. The color-altering phenomenon is typically due to a chemical change, such as through oxidation, resulting from heat exposure.

The term "protection leaving group" refers to any moiety which can be used to block the reaction of a functional group and which can be removed, as desired, to expose or deprotect a functional group of an activator. Protection leaving groups of the present invention can be non-reactive with respect to other components of the color forming composition. Thus, the protection leaving group typically does not include reactive groups which react outside of the protecting and deprotecting mechanism described in more detail below.

The term "activator" refers to a compound that is reactive with leuco dyes upon introduction of energy in the form of light and/or heat.

The term "protected activator" refers to the combination of an activator and a protection leaving group which is attached to the functional group(s) of the activator.

The term "deprotecting agent" refers to a compound which reacts with the protection leaving group to expose a functional group of an activator for reaction with a leuco dye. Deprotecting agents can be sensitive to exposure to a predetermined amount of energy in the form of heat or light.

As used herein, "developing" or "development" refers to the interaction or reaction of a leuco dye with an activator to produce a visible composition having a desired color.

As used herein, "absorber" refers generally to an optional electromagnetic radiation sensitive agent that can generate heat or otherwise transfer energy to surrounding molecules by electrical contact upon exposure to a predetermined frequency of electromagnetic radiation. The predetermined frequency can be different from one absorber composition to the next. When admixed with or in thermal or electrical contact with a leuco dye and/or activator, an absorber can be present in sufficient quantity so as to produce heat sufficient to at least partially develop the leuco dye in accordance with embodiments of the present invention. In some cases the protection leaving group and absorber can be in the same molecule e.g. p-nitrobenzyl esters.

The term "thermal contact" refers to the spatial relationship between an absorber and a color forming composition. For example, when an absorber is heated by interaction with electromagnetic radiation, the heat generated by the absorber should be sufficient to cause the leuco dye of the color forming composition to darken through reaction with a deprotected activator. Thermal contact can include close proximity between an absorber and a leuco dye and/or activator, which allows for heat transfer from the absorber toward the leuco dye and/or activator. Thermal contact can also include actual contact between an absorber and a leuco dye and/or activator, such as in immediately adjacent layers, or in an admixture including both constituents.

"Electrical contact" refers to the proximity of molecules in distances on the scale of van der Walls radii, in crystalline matrix or films, where the molecules can react in ground or excited states and form activated species such as "exiplexes".

"Stabilizing agent" refers to compositions that can be used to reduce undesired development of leuco dyes upon exposure to ambient or other light sources.

The term "spin-coatable composition" includes a liquid carrier having various components dissolved or dispersed therein. In some embodiments, the spin-coatable composition can comprise a color forming composition and an infrared absorber in a common liquid carrier. In other embodiments, fewer components can be present in a liquid carrier forming the spin-coatable composition. Thus, for example, the color forming composition can be spin-coatable and applied to a substrate and then an infrared absorber can be formed in a separate layer which can be applied by spraying, screen-printing, or other methods which do not require spin-coatability. Coating compositions can be spin-coatable in one embodiment, or can be configured for other application methods as well e.g. printing such as offset, inkjet, gravure, roller coating, or other application methods known to those skilled in the art.

As used herein, "optical density" refers to the logarithm of the reciprocal of reflectance, where reflectance is the ratio of reflected power to incident power.

As used herein, "optical disk" is meant to encompass audio, video, multi-media, and/or software disks that are machine readable in a CD and/or DVD drive, or the like. Examples of optical disk formats include writeable, recordable, and rewriteable disks such as DVD, DVD-R, DVD-RW, DVD+R, DVD+RW, DVD-RAM, CD, CD-ROM, CD-R, CD-RW, and the like. Other like formats may also be included, such as similar formats and formats to be developed in the future.

As used herein, "protonic acid" refers to an acid which ionizes in aqueous solution to liberate hydrogen ions. Typical protonic acids include, but are not limited to, hydrochloric acid, sulfuric acid, phosphoric acid, fluoric acid, bromic acid, and the like.

As used herein, "graphic display" can include any visible character or image found on an optical disk. Typically, the graphic display is found prominently on one side of the optical disk, though this is not always the case.

As used herein, "data" is typically used with respect to the present disclosure to include the non-graphic information contained on the optical disk that is digitally or otherwise embedded therein. Data can include audio information, video information, photographic information, software information, and the like.

It is important to note that, with respect to leuco dyes, absorbers, activators with protection leaving groups, and other non-liquid carrier components, the weight percent values are measured relative to a dry basis, thus excluding the liquid carrier. In other words, unless otherwise specified, values of "wt %," "% by weight," or "weight percent" refer to the compositions that will be present in the color forming composition excluding any carrier, such as after drying or curing, as in case of UV (ultraviolet) or EB (electron beam) curable formulations, on a substrate.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 $\mu$m to about 200 $\mu$m should be interpreted to include not only the explicitly recited limits of 1 $\mu$m to about 200 $\mu$m, but also to include individual sizes such as 2 $\mu$m, 3 $\mu$m, 4 $\mu$m, and sub-ranges such as 10 $\mu$m to 50 $\mu$m, 20 $\mu$m to 100 $\mu$m, etc.

In accordance with the present invention, the color forming composition includes a leuco dye, a protected activator, and a deprotecting agent. The protected activators of the present invention comprise an activator having at least one acid group and a protection leaving group chemically attached to the at least one acid group. Upon application of energy in the form of heat or light, the protection leaving group reacts with the deprotecting agent, thereby exposing the functional acid group(s) of the activator. The unprotected activator can then react with the leuco dye to form a colored dye.

Activators

A wide variety of activators can be protected using various protection leaving groups. Attachment of the protection leaving group onto an activator by a chemical bond(s) can be carried out according to conventionally known methods such as those described in Greene, T W and Wuts, P G M "Protective Groups in Organic Synthesis", John Wiley, N.Y., 2nd Edition (1991), the disclosure of which is hereby incorporated herein by reference in its entirety (see especially pages 246–292). Another resource describing such mechanisms is J. F. W. McOmie, "Protective Groups in Organic Chemistry", Plenum Press (1973), which is also incorporated herein by reference in its entirety.

Although a variety of methods can be utilized to form the protected activators of the present invention, such as those described in Greene and McOmie, the following examples illustrate several mechanisms for protecting an acid activator. Phenolic and catechol activators can be protected by acylation and condensation reactions with an acyl chloride, acyl anhydride, or activated ester such as succinimidyl ester. Such acylation and condensation reactions can be performed in the presence of a base, such as NaOH, or simply by heating. Alternatively, the reaction can be performed by mixing an amine such as triethyl amine with a dipolar aprotic solvent e.g. acetonitrile or dioxane, followed by an aqueous work up (addition of water and subsequent extraction of the protected activator using ether or the like) or evaporation and purification.

More specifically, the activators employed in the present invention can contain various functional groups, such as, hydroxy, thio and amine groups, which act as a Lewis acid. After the protection leaving group reacts with the functional group, the resulting protected activator can be an ester, ether, sulfonate, carbonate, carbamate, or phosphinate. Several specific protected activators include trifluoroacetate, 2-trimethylsilyl ethyl ester, t-butyl ester, p-nitrobenzyl ester, nitrobutyl ester, and trichloroethyl ester.

Examples of acidic materials that can be used as activators in the present invention include, without limitation, phenols, carboxylic acids, cyclic sulfonamides, protonic acids, and compounds having a pKa of less than about 7.0, and mixtures thereof. Specific phenolic and carboxylic activators can include, without limitation, boric acid, oxalic acid, maleic acid, tartaric acid, citric acid, succinic acid, benzoic acid, stearic acid, gallic acid, salicylic acid, 1-hydroxy-2-naphthoic acid, o-hydroxybenzoic acid, m-hydroxybenzoic acid, 2-hydroxy-p-toluic acid, 3,5-xylenol, thymol, p-t-butylphenyl, 4-hydroxyphenoxide, methyl-4-hydroxybenzoate, 4-hydroxyacetophenone, a-naphthol, naphthols, catechol, resorcin, hydroquinone, 4-t-octylcatechol, 4,4'-butylidenephenol, 2,2'-dihydroxydiphenyl, 2,2'-methylenebis(4-methyl-6-t-butylphenol), 2,2'-bis(4'-hydroxyphenyl) propane, 4,4'-isopropylidenebis(2-t-butylphenol), 4,4'-secbutylidenediphenol, pyrogallol, phloroglucine, phlorogluocinocarboxylic acid, 4-phenylphenol, 2,2'-methylenebis(4-chlorophenyl), 4,4'-isopropylidenediphenol, 4,4'-isopropylidenebis(2-chlorophenol), 4,4'-isopropylidenebis(2-methylphenol), 4,4'-ethylenebis(2-methylphenol), 4,4'-thiobis(6-t-butyl-3-methylphenol), bisphenol A and its derivatives (such as 4,4'-isopropylidenediphenol (bisphenol A), 4-4'-cyclohexylidenediphenol, p,p'-(1-methyl-n-hexylidene) diphenol, 1,7-di (4-hydroxyphenylthio)-3,5-dioxaheptane), 4-hydroxybenzoic esters, 4-hydroxyphthalic diesters, phthalic monoesters, bis(hydroxyphenyl)sulfides, 4-hydroxyarylsulfones, 4-hydroxyphenylarylsulfonates, 1,3-di[2- (hydroxyphenyl)-2-propyl]benzenes, 1,3-dihydroxy-6(α,α-dimethylbenzyl)benzene, resorcinols, hydroxybenzoyloxybenzoic esters, bisphenolsulfones, bis-(3-allyl-4-hydroxyphenyl)sulfone (TG-SA), bisphenolsulfonic acids, 2,4-dihydroxy-benzophenones, novolac type phenolic resins, polyphenols, saccharin, 4-hydroxyacetophenone, p-phenylphenol, benzyl-p-hydroxybenzoate (benzalparaben), 2,2-bis(p-hydroxyphenyl) propane, p-tert-butylphenol, 2,4-dihydroxy-benzophenone, and p-benzylphenol.

In one aspect of the present invention, the activator is a phenol compound. In a more detailed aspect, the activator can be a bisphenol such as TG-SA. In yet another aspect, the activator compound can be a carboxylic acid selected from the group consisting of boric acid, oxalic acid, maleic acid, tartaric acid, citric acid, succinic acid, benzoic acid, stearic acid, gallic acid, salicylic acid, ascorbic acid, and mixtures thereof.

Protection Leaving Groups

As mentioned above, the functional groups of the activators of the present invention are protected by a protection leaving group. In one aspect, the protection leaving group provides a mechanism for protecting the acid functional group of the activator. If the functional group of the activator is a hydroxy group, suitable protecting groups include, for example esters, sulfonates, ethers, phosphinates, carbonates, carbamates (i.e. esters of carbamic acid), and mixtures thereof. In one detailed aspect of the present invention, the protection leaving group is an acyl group.

A variety of ethers can be used in the present invention as protection leaving groups such as silyl ethers, alkyl ethers, aromatic ethers, and mixtures thereof. Several non-limiting examples of ethers suitable for use in the present invention include methyl ether, 2-methoxyethoxymethyl ether (MEM), cyclohexyl ether, o-nitrobenzyl ether, 9-anthryl ether, tetrahydrothiopyranyl, tetrahydrothiofuranyl, 2-(phenylselenyl)ethyl ether, benzyloxymethyl ethers, methoxyethoxymethyl ethers, 2-(trimethylsilyl)ethoxymethyl ether, methylthiomethyl ether, phenylthiomethyl ether, 2,2-dichloro-1,1-difluoroethyl ether, tetrahydropyranyl, phenacyl, phenylacetyl, propargyl, p-bromophenacyl, cyclopropylmethyl ether, allyl ether, isopropyl ether, t-butyl ether, benzyl ether, 2,6-dimethylbenzyl ether, 4-methoxybenzyl ether, o-nitrobenzyl ether, 2-bromoethyl ether, 2,6-dichlorobenzyl ether, 4-(dimethylaminocarbonyl)benzyl ether, 9-anthrymethyl ether, 4-picolyl ether, heptafluoro-p-tolyl ether, tetrafluoro-4-pyridyl ether, silyl ethers (e.g., trimethylsilyl, t-butyldimethylsilyl, t-butyldiphenylsilyl, tribenzylsilyl, triisopropylsilyl, isopropyldimethylsilyl, 2-trimethylsilyl, 2-(trimethylsilyl) ethoxymethyl (SEM) ether, and mixtures thereof.

Several non-limiting examples of esters suitable for use in the present invention include formate ester, acetate ester, isobutyrate ester, levulinate ester, pivaloate ester, aryl pivaloate esters, aryl methanesulfonate esters, adamantoate ester, benzoate ester, 2,4,6-trimethylbenzoate (mesitoate) ester, 2-trimethyl silyl ester, 2-trimethylsilyl ethyl ester, t-butyl ester, p-nitrobenzyl ester, nitrobutyl ester, trichloroethyl ester, any alkyl branched or aryl substituted ester, 9-fluorenecarboxylate, xanthenecarboxylate, and mixtures thereof. In one aspect of the present invention, the protection leaving group can be formate, acetate, isobutyrate, levulinate, pivaloate, and mixtures thereof.

Several non-limiting examples of carbonates and carbamates suitable for use in the present invention include 2,2,2-trichloroethyl carbonate, vinyl carbonate, benzyl carbonate, methyl carbonate, p-nitrophenyl carbonate, p-nitrobenzyl carbonate, S-benzyl thiocarbonate, N— phenylcarbamate, 1-adamantyl carbonate, t-butyl carbonate, 4-methylsulfinylbenzyl, 2,4-dimethylbenzyl, 2,4-dimethylpent-3-yl, aryl carbamates, methyl carbamate, benzyl carbamate, cyclic borates and carbonates, and mixtures thereof.

Several non-limiting examples of phosphinates suitable for use in the present invention include dimethylphosphinyl, dimethylthiophosphinyl, dimethylphosphinothioyl, diphenylphosphothioyl, and mixtures thereof.

Several non-limiting examples of sulfonates suitable for use in the present invention include methanesulfonate, toluenesulfonate, 2-formylbenzenesulfonate, and mixtures thereof.

Exemplary protecting groups for hydroxyl functional groups of activators include, for example, t-butyloxycarbonyl, allyloxycarbonyl, benzyloxycarbonyl, o-nitrobenzyloxycarbonyl, and trifluoroacetate.

The color forming compositions of the present invention can include from about 6% to about 45% by weight of protected activator in one embodiment. In another embodiment, the protected activator can be present from about 20% and about 40% by weight. In a further detailed aspect, the protected activator can be present at from about 25% to about 38% by weight.

Deprotecting Agents

A deprotecting agent can also be included in the color forming composition and is configured for removing the protection leaving group upon application of heat. In one aspect, the deprotecting agent provides a mechanism for removing the above protection leaving groups via a chemical reaction therewith. Although it is recognized that the chemistry of some protection leaving groups would not always require a separate deprotecting agent and can be removed by the addition of heat, such deprotecting agents are considered to improve the stability and development of the leuco dyes in accordance with the principles of the present invention. Deprotecting agents suitable for use in the present invention include, without limitation, amines such as alpha-hydroxy amines, primary amines and secondary amines. In one aspect of the present invention the deprotecting agent can be valoneol, prolinol, 2-hydroxy-1-amino-propanol, 2-amino-3-phenyl-1-propanol, (R)-(−)-2-phenyl glycinol, 2-amino-phenylethanol, 1-naphthylethyl amine, 1-aminonaphthalene, morpholin, and the like. In one aspect, the deprotecting agent can be 2-hydroxy-1-amino-propanol. In another aspect, suitable deprotecting agents include amines such as those melting between 35° C. to 175° C. including 2-amino-3-phenyl-1-propanol, (R)-(−)-2-phenyl glycinol, 2-amino-phenylethanol, or such as those boiling between 80° C. and 310° C. including 1-naphthyl ethyl amine, 1-aminonaphthalene, morpholin, etc.

The deprotecting agent can be present at any concentration which is sufficient to react with enough protection leaving groups to allow a visible color change in the leuco dye. It will be understood that the concentration of deprotecting agent can be tailored to affect the speed and degree of the reaction upon exposure to heat. However, as a general guideline, the deprotecting agent to activator molar ratio can be from about 10:1 to about 1:4, and one aspect can be from about 1:1 to about 1:2.

Leuco Dyes

Leuco dyes suitable for use in the present invention include almost any known leuco dye. Suitable leuco dyes include, but are not limited to, fluorans, phthalides, aminotriarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinones, tetrahalo-p,p'-biphenols, 2(p-hydroxyphenyl)4,5-diphenylimidazoles, phenethylanilines, and mixtures thereof. In one aspect of the present invention, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-methyl-7-anilinofluorane, 3-(N-ethyl-N-isoamylamino)-6-methyl-7-anilinofluorane, 3-diethylamino-6-methyl-7-(o,p-dimethylanilino)fluorane, 3-pyrrolidino-6-methyl-7-anilinofluorane, 3-piperidino-6-methyl-7-anilinofluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-methyl-7-anilinofluorane, 3-dibutylamino-7-(o-chloroanilino) fluorane, 3-diethylamino-7-(o-chloroanilino)fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1 (3H)-isobenzofuranone,4,5,6,7-tetrachloro-3,3-bis[2-[4-(dimethylamino)phenyl]-2-(4-methoxyphenyl)ethenyl], and mixtures thereof. Aminotriarylmethane leuco dyes can also be used in the present invention such as tris(N,N-dimethylaminophenyl) methane (LCV); deutero-tris(N,N-dimethylaminophenyl) methane (D-LCV); tris(N,N-diethylaminophenyl) methane (LECV); deutero-tris(4-diethylaminolphenyl) methane (D-LECV); tris(N,N-di-n-propylaminophenyl) methane (LPCV); tris(N,N-di-n-butylaminophenyl) methane (LBCV); bis(4-diethylaminophenyl)-(4-diethylamino-2-methyl-phenyl) methane (LV-1); bis(4-diethylamino-2-methylphenyl)-(4-diethylamino-phenyl) methane (LV-2); tris(4-diethylamino-2-methylphenyl) methane (LV-3); deutero-bis(4-diethylaminophenyl)-(4-diethylamino-2-methylphenyl) methane (D-LV-1); deutero-bis(4-diethylamino-2-methylphenyl)(4-diethylaminophenyl) methane (D-LV-2); bis(4-diethylamino-2-methylphenyl)(3,4-dimethoxyphenyl) methane (LB-8); aminotriarylmethane leuco dyes having different alkyl substituents bonded to the amino moieties wherein each alkyl group is independently selected from C1–C4 alkyl; and aminotriaryl methane leuco dyes with any of the preceding named structures that are further substituted with one or more alkyl groups on the aryl rings wherein the latter alkyl groups are independently selected from C1–C3 alkyl. Other leuco dyes can also be used in connection with the present invention and are known to those skilled in the art. A more detailed discussion of some of these types of leuco dyes may be found in U.S. Pat. Nos. 3,658,543 and 6,251,571, each of which are hereby incorporated by reference in their entireties.

Upon heat-induced oxidation, protonation, ring-opening, or the like, in the presence of the unprotected activator, leuco dyes can form dyes having a variety of optical characteristics. Although a wide range of compositions are suitable for use in the present invention, the color forming composition can contain at least about 3% by weight of leuco dye, and in more detail, can be present at from about 4% and about 20% by weight. These ranges are only exemplary and other weight ranges can be used, depending on the desired image characteristics and other considerations.

Electromagnetic Radiation Absorber

An electromagnetic radiation absorber can optionally be part of the color forming composition. The radiation absorber can be applied as a separate layer which can be optionally spin-coatable or printable, or can be applied in a common liquid carrier with the color forming composition. The absorber can act as an energy antenna, providing heat to surrounding areas upon interaction with an energy source. As a predetermined amount of heat can be provided by the electromagnetic radiation absorber, matching of the electromagnetic radiation frequency and intensity to the absorber used can be carried out to optimize the system. The absorber can be present in the color forming composition in an amount from about 0.001% to about 10% by weight, and typically, from about 0.5% to about 1% by weight, although other weight ranges may be desirable depending on the activity of the particular absorber. These weight percentages represent an amount of absorber that can be present when included as part of the color forming composition. These weight percentages can be altered in other embodiments, such as when the absorber is applied separately with respect to one or more other layers.

Various absorbers will act as an antenna to absorb electromagnetic radiation of specific frequencies and ranges. Of particular interest is laser light having infrared frequencies from about 600 nm to about 1200 nm. Therefore, the present invention can provide color forming compositions optimized for use in devices that emit frequencies within this range. Typical commercial IR lasers found in common CD and DVD equipment are at a frequency of about 650, 780, and 900 nm, and thus, the compositions of the present invention using appropriate infrared radiation absorbers can be used in equipment that is already commonly available on the market.

The absorber can be configured to be in a heat-conductive relationship with the leuco dyes of the present invention. For example, the absorber can be placed in the same layer as the leuco dye as part of an admixture, or can be in a separate layer. Thus, the absorber can be admixed with or in thermal or electrical contact with the color forming composition. In one aspect of the present invention, the absorber can be applied to the substrate in a separate adjacent layer prior to or after applying the color forming composition as a layer. In one embodiment, consideration can also be given to choosing the absorber such that any light absorbed in the visible range does not adversely affect the graphic display or appearance of undeveloped leuco dye.

Although an inorganic compound can be used, the absorber typically can be an organic compound, such as, but not limited to polymethine dyes, polymethyl indolium dyes, metal complex IR dyes, indocyanine green, heterocyclic compounds and combinations thereof. Suitable polymethyl indolium compounds available from Aldrich Chemical Company include 2-[2-[2-chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium perchlorate; 242-[2-Chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium chloride; 2-[2-[2-chloro-3-[(1,3-dihydro-3,3-dimethyl-1-propyl-2H-indol-2-ylidene) ethylidene]-1-cyclohexen-1-yl]ethenyl]-3,3-dimethyl-1-propylindolium iodide; 2-[2-[2-chloro-3-[(1,3-dihydro-1,3,3-trimethyl-2H-indol-2-ylidene)ethylidene]-1-cyclohexen-1-yl]ethenyl]-1,3,3-trimethylindolium iodide; 2-[2-[2-chloro-3-[(1,3-dihydro-1,3,3-trimethyl-2H-indol-2-ylidene) ethylidene]-1-cyclohexen-1-ylethenyl]-1,3,3-trimethylindolium perchlorate; 2-[2-[3-[(1,3-dihydro-3,3-dimethyl-1-propyl-2H-indol-2-ylidene)ethylidene]-2-(phenylthio)-1-cyclohexen-1-yl]ethenyl]-3,3-dimethyl-1-propylindolium perchlorate; and mixtures thereof. In one aspect of the present invention, the IR absorber is 2-[2-[2-chloro-342-(1,3-dihydro-1,3,3-trimethyl-2H-indol-2-ylidene)-ethylidene]-1-cyclopenten-1-yl-ethenyl]-1,3,3-trimethyl-3H-indolium perchlorate. Other suitable absorbers can also be used in the present invention as are known to those skilled in the art, and can be found in such references as "Infrared Absorbing Dyes", Matsuoka, Masaru, ed., Plenum Press, New York, 1990 (ISBN 0-306-43478-4) and "Near-Infrared Dyes for High Technology Applications", Daehne, Resch-Genger, Wolfbeis, Kluwer Academic Publishers (ISBN 0-7923-5101-0), both of which are incorporated herein by reference in their entireties. Although, the specific activators and absorbers discussed herein are separate compounds, such activity can also be provided by constituent groups of a leuco dye which incorporates the activation and/or radiation absorbing action within the leuco dye molecule.

Other Optional Ingredients

There are many optional ingredients that can be present in the compositions of the present invention. For example, a binder can also be included in the compositions of the present invention, either in single layer or multiple layer embodiments. Suitable binders are known to those skilled in the art and can include, but are not limited to, polymeric materials such as polyacrylate from monomers and oligomers, polyvinyl alcohols, polyvinyl pyrrolidines, polyethylenes, polyphenols or polyphenolic esters, polyurethanes, acrylic polymers, and mixtures thereof. In order to provide desirable color forming properties, various factors such as viscosity and solids content can be considered. The color forming compositions of the present invention can have less than about 10% by weight of solids, which typically provides good coating properties. For example, in one aspect, the solids content of a spin-coatable coating composition can be about 7% by weight.

It can sometimes be desirable to add a plasticizer to improve coating flexibility, durability, and coating performance. Plasticizers can be either solid or liquid plasticizers. Such suitable plasticizers are well known to those skilled in the art, as exemplified in U.S. Pat. No. 3,658,543, which is incorporated herein by reference in its entirety. If the color forming composition and/or absorber is applied in multiple layers, the plasticizer and binder can be included in any of the individual liquid carriers.

Stabilizing agents can also be included in the color forming compositions of the present invention or in an adjacent layer. Several examples of suitable stabilizing agents include a polyhydroxybenzophenone, hydroxylamine, triarylimidazole, hydroxyphenylbenzotriazole, and mixtures thereof.

Other variations can also be implemented, including the adding of a non-leuco colorant to impart additional desired color to the image. For example, the use of an opacifier pigment or other non-leuco colorant can be used to provide background color to the substrate. The non-leuco colorants can be added to the color forming composition, underprinted, or overprinted as long as the development of the leuco dye is not prevented from at least some development due to the presence of the optional colorant. In another embodiment, portions of the leuco dye can then be developed producing an image with a colored background. In other words, if a colored background is desired that will remain independent of leuco dye development, an opacifier pigment, other pigment, and/or dye can be admixed in the carrier to impart the desired color. Examples of opacifiers include calcium carbonate, titanium dioxide, and other known opacifiers Additionally, examples of other non-leuco colorants include dyes or other pigments.

In one embodiment, the color forming composition can be prepared in is substantially transparent or translucent. Any suitable liquid s an alcohol or surfactant, can be used which are compatible with uco dye and other ingredients chosen for use. When the color osition is prepared in a solution form, it may be desirable to olored coating over at least a portion of the substrate beneath the ition. The optional colored coating produces a background color underneath the solution layer. This colored coating can contain uco colorants such as other pigments and/or dyes. Alternatively, olorant may be added to the data layer to produce the desired olor. The activator can be admixed within the solution or coated rate either before or after the solution is coated thereon. If a olor is pre-printed, such coatings and compositions can be applied e using any of a variety of known techniques such as screen- oating, sputtering, or spray coating. Each coating may be applied sequentially. In addition, such colored coatings may be applied forming compositions of the present invention. It has been found ambient light stability is achieved when a colored overcoat is color forming compositions of the present invention. additional components, such as lubricants, surfactants, and rting moisture resistance, can also be added to provide etection to the color forming composition. Other overcoat an also be used and are well known to those skilled in the art. magnetic radiation application for development embodiment of the present invention, the color forming n be applied to a substrate. The composition can be applied n technique such as spin-coating, screen printing, sputtering, or the like. A variety of substrates can be used such as optical c surfaces, glass, ceramic, or cellulose papers. In one e color forming composition can be applied to an optical disk and select portions thereof developed using a laser or heat source. Typically, an image to be formed on the surface is digitally stored and then rasterized or spiralized. The resulting data is delivered to an infrared radiation source which exposes portions of the color forming composition to infrared radiation while the optical disk is spinning. The infrared radiation source can be a laser such as those found in commercially available CD/DVD writeable and/or rewriteable systems.

The present invention relates generally to forming color images on a substrate using the color forming compositions of the present invention which can optionally be spin-coatable or printable. The compositions of the present invention can be prepared and applied in a variety of ways to a variety of substrates. For example, a coating composition can be prepared that includes a liquid carrier (which will be substantially removed upon drying) that contains, without limitation, a leuco dye, a protected activator, a deprotecting agent, an electromagnetic radiation absorber, and a binder. The coating composition includes the liquid carrier, which can act to improve coating performance, but which can be removed upon coating through known liquid removal processes. Typically, at least a portion of the liquid carrier can be driven off or allowed to evaporate after the coating process is complete. The liquid carrier can include, but is not limited to, solvents such as methylethyl ketone, isopropyl alcohol or other alcohols, water, surfactants, and mixtures thereof.

The color forming composition can cover the entire surface of a substrate or merely a portion thereof. In one embodiment, in order for the color forming composition to be developed as desired on the optical disk surface, the absorber layer can be formed on at least approximately the same portions of the optical disk as the color forming composition layer. This provides an optical disk having the absorber layer in thermal contact with the color forming composition layer. If the two layers are not in actual contact, but are close enough in proximity for thermal activation of the leuco dye to occur, the layers can also be said to be in thermal contact.

Once the color forming composition is applied to a substrate the conditions under which the color forming compositions of the present invention are developed can be varied. For example, one can vary the electromagnetic radiation frequency, heat flux, and exposure time. The amount of heat which is to be applied depends partially on the activation energy of the deprotecting reaction described above. However, the heat applied is typically sufficient to remove the protection leaving group without also decomposing the color forming composition. Variables such as spot size and laser power will also affect any particular system design and can be chosen based on the desired results. With these variables, the infrared radiation source can direct infrared radiation to the color forming composition in accordance with data received from a signal processor. Further, leuco dye and/or infrared radiation absorber concentration and proximity to one another can also be varied. Typically, the absorber and the leuco dye are present in a common layer, and thus, concentration ratios can be considered for a desired affect. However, if the color forming composition and absorber are placed in separate layers, proximity can be considered.

The leuco dyes of the color forming compositions can be developed using lasers having from about 15 to 100 mW power usage, although lasers having a power outside this range can also be used. Typically, lasers having from about 30 mW to about 50 mW are readily commercially available. The spot size can be determined by considering the electromagnetic radiation source, and can range from about 1 to about 200 $\mu$m, though smaller or larger sizes can also be used. In one embodiment, a radiation spot size of between about 10 and about 60 $\mu$m can also be utilized. In a further aspect, spot sizes of 20 by 50 $\mu$m can provide a good balance between resolution and developing speed.

Heat flux is a variable that can be altered as well, and can be from about 0.05 to 5.0 J/cm$^2$ in one embodiment, and from about 0.3 to 0.5 J/cm$^2$ in a second embodiment. Heat flux in these ranges allow for development of leuco dyes in from about 10 to about 100 microseconds per dot in some embodiments. Those skilled in the art can adjust these variables and those discussed immediately above to achieve a variety of resolutions and developing times.

EXAMPLES

The following examples illustrate exemplary embodiments of the invention. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

A dispersion of 20 wt % flouran dye S-205, 0.5 wt % IR780 absorber (Aldrich), 10 wt % 2-hydroxy-1-aminopropanol, 25 wt % acetyl TG-SA (protected activator), 20 wt % cellulose butyl acetate as a binder, and 0.1 wt % IR 780 with the balance being methylethyl ketone was prepared. The color forming solution was applied to a glass substrate and dried under vacuum to form a film. Heat was then applied using a laser at about 45 mW power for about 100 microseconds. The following reaction resulted in an intense black color having an optical density greater than 1.0. A reaction scheme depicting the color forming components is shown as follows:

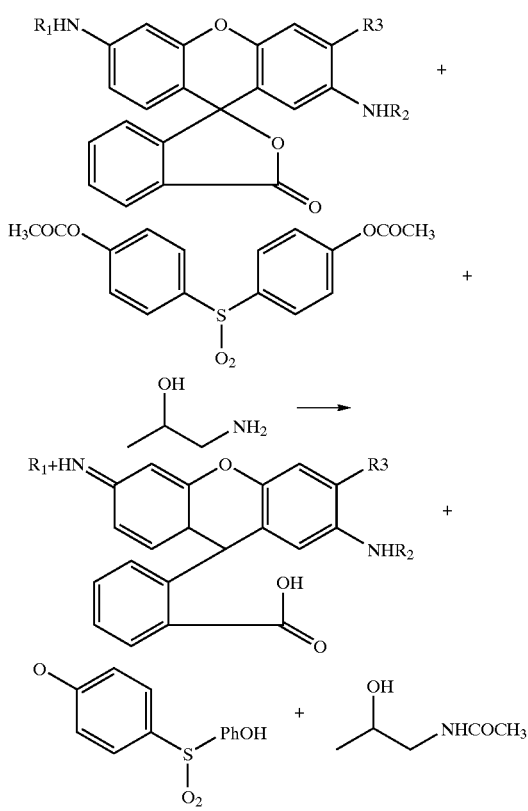

Example 2

A dispersion of 20 wt % flouran dye S-205, 10 wt % 2-hydroxy-1-amino-propanol, 25 wt % acetyl TG-SA (protected activator), 45 wt % CDG000 UV curable binder available from Norcote Inc. was prepared. The color forming dispersion was applied to a glass substrate and cured using UV radiation. Heat was then applied using a laser at about 45 mW power for about 100 microseconds. A similar reaction as shown in Example 1 resulted in an intense black color having an optical density of less than 1.0.

It is to be understood that the above-referenced arrangements are illustrative of the application for the principles of the present invention. Numerous modifications and alternative arrangements can be devised without departing from the spirit and scope of the present invention while the present invention has been described above in connection with the exemplary embodiments(s) of the invention. It will be apparent to those of ordinary skill in the art that numerous modifications can be made without departing from the principles and concepts of the invention as set forth in the claims.

What is claimed is:

1. A color forming composition, comprising:
   a) a color forming leuco dye;
   b) an activator having at least one acid group, said at least one acid group being protected by a protection leaving group to form a protected activator; and
   c) a deprotecting agent configured for removing the protection leaving group from the activator upon application of energy.

2. The composition of claim 1, wherein the activator comprises at least one functional group selected from the group consisting of hydroxyl, thio, and amine groups, and wherein the hydroxyl, thio, and amine groups act as a Lewis acid.

3. The composition of claim 1, wherein the activator is a member selected from the group consisting of phenols, carboxylic acids, cyclic sulfonamides, protonic acids, and mixtures thereof.

4. The composition of claim 3, wherein the activator is bis-(3-allyl-4-hydroxyphenyl)sulfone.

5. The composition of claim 3, wherein the activator is a carboxylic acid selected from the group consisting of boric acid, oxalic acid, maleic acid, tartaric acid, citric acid, succinic acid, benzoic acid, stearic acid, gallic acid, salicylic acid, ascorbic acid, and mixtures thereof.

6. The composition of claim 1, wherein the protected activator is a member selected from the group consisting of esters, sulfonates, ethers, phosphinates, carbonates, carbamates, and mixtures thereof.

7. The composition of claim 6, wherein the protected activator is an ester selected from the group consisting of formate ester, acetate ester, isobutyrate ester, levulinate ester, pivaloate ester, aryl pivaloate esters, aryl methanesulfonate esters, adamantoate ester, benzoate ester, 2,4,6-trimethylbenzoate (mesitoate) ester, 2-trimethyl silyl ester, 2-trimethylsilyl ethyl ester, t-butyl ester, p-nitrobenzyl ester, nitrobutyl ester, trichloroethyl ester, 9-fluorenecarboxylate, xanthenecarboxylate, and mixtures thereof.

8. The composition of claim 6, wherein the protected activator is a sulfonate selected from the group consisting of methanesulfonate, toluenesulfonate, 2-formylbenzenesulfonate, and mixtures thereof.

9. The composition of claim 6, wherein the protected activator is an ether selected from the group consisting of silyl ethers, alkyl ethers, aromatic ethers, and mixtures thereof.

10. The composition of claim 6, wherein the protection leaving group is an acyl selected from the group consisting of formate, acetate, levulinate, pivaolate, and mixtures thereof.

11. The composition of claim 6, wherein the protection leaving group is acetate.

12. The composition of claim 1, wherein the deprotecting agent is a member selected from the group consisting of valoneol, prolinol, 2-hydroxy-1-amino-propanol, 2-amino-3-phenyl-1-propanol, (R)-(−)-2-phenyl glycinol, 2-aminophenylethanol, 1-naphthylethyl amine, 1-aminonaphthalene, morpholin, and mixtures thereof.

13. The composition of claim 12, wherein the deprotecting agent is 2-hydroxy-1-amino-propanol.

14. The composition of claim 1, wherein the color forming leuco dye is selected from the group consisting of fluorans, phthalides, aminotriarylmethanes, and mixtures thereof.

15. The composition of claim 1, wherein the protection leaving group is an acyl and the deprotecting agent is an alpha hydroxylamine.

16. The composition of claim 1, further comprising an infrared radiation absorber.

17. The composition of claim 1, wherein the color forming composition is spin-coatable.

18. An optical disk, comprising an optical disk substrate having a color forming composition coated thereon, said color forming composition comprising:
   a) a color forming leuco dye;
   b) an activator having at least one acid group, said at least one acid group being protected by a protection leaving group to form a protected activator; and
   c) a deprotecting agent configured for removing the protection leaving group from the activator upon application of energy.

19. The optical disk of claim 18, wherein the protected activator is a member selected from the group consisting of esters, sulfonates, ethers, phosphinates, carbonates, carbamates, and mixtures thereof.

20. The optical disk of claim 18, wherein the deprotecting agent is selected from the group consisting of valoneol, prolinol, 2-hydroxy-1-amino-propanol, 2-amino-3-phenyl-1-propanol, (R)-(−)-2-phenyl glycinol, 2-aminophenylethanol, 1-naphthylethyl amine, 1-aminonaphthalene, morpholin, and mixtures thereof.

21. The optical disk of claim 18, wherein the leuco dye is selected from the group consisting of fluorans, phthalides, aminotriarylmethanes, and mixtures thereof.

22. The optical disk of claim 18, wherein the color forming composition further comprises an infrared radiation absorber admixed with or in thermal contact with the protected activator and deprotecting agent.

23. The optical disk of claim 18, wherein the color forming composition further comprises a binder.

24. The optical disk of claim 18, wherein the color forming composition further comprises a non-leuco colorant.

25. A method for preparing color forming compositions, comprising:
   a) attaching a protection leaving group to an acid-containing activator to form a protected activator; and
   b) combining the protected activator with a color forming leuco dye and a deprotecting agent configured for removing the protection leaving group from the activator upon application of energy.

26. A method of forming color images on a substrate, comprising:
   a) applying a color forming composition onto a substrate, said color forming composition including:
      i) a color forming leuco dye;
      ii) an activator having at least one acid group, said at least one acid group being protected by a protection leaving group; and
      iii) a deprotecting agent configured for removing the protection leaving group from the activator upon application of heat; and
   b) applying heat sufficient to remove the protection leaving group without decomposing the color forming composition.

27. The method of claim 26, wherein the heat is applied at from about 0.3 to about 0.5 $J/cm^2$.

28. The method of claim 26, wherein the heat is applied for about 10 to about 100 microseconds.

29. The method of claim 26, wherein the color forming composition further comprises an infrared radiation absorber admixed with or in thermal contact with the activator and deprotecting agent.

30. The method of claim 29, wherein the heat is applied using an infrared laser.

31. The method of claim 26, wherein the activator and protection leaving group form a member selected from the group consisting of esters, sulfonates, ethers, phosphinates, carbonates, carbamates, and mixtures thereof.

32. The method of claim 26, wherein the deprotecting agent is selected from the group consisting of valoneol, prolinol, 2-hydroxy-1-amino-propanol, 2-amino-3-phenyl-1-propanol, (R)-(−)-2-phenyl glycinol, 2-aminophenylethanol, 1-naphthylethyl amine, 1-aminonaphthalene, morpholin, and mixtures thereof.

33. The method of claim 26, wherein the substrate is an optical disk.

* * * * *

UNITED STATES PATENT AND TRADEMARK OFFICE
CERTIFICATE OF CORRECTION

PATENT NO. : 6,958,181 B1
APPLICATION NO. : 10/656735
DATED : October 25, 2005
INVENTOR(S) : Gore It is certified that error appears in the above-identified patent and that said Letters Patent is hereby corrected as shown below:

In the Specification

Col. 9 (line 37), delete the entire line beginning with "242-..." and replace it with the following:
-- 2-[2-[2-Chloro-3[2-(1,3-dihydro-1,3,3-trimethyl-2H-indol- --.

Col. 9 (line 52), delete the entire line beginning with "chloro-342-" and replace it with the following:
-- chloro-3-[2-(1,3-dihydro-1,3,3-trimethyl-2H-indol-2- --.

Col. 10 (line 54), after "in", insert --solution which--.

Col. 10 (line 55), delete "s" and insert therefor --carrier, such as--.

Col. 10 (line 56), delete "uco" and insert therefor --a particular leuco--.

Col. 10 (line 57), delete "osition" and insert therefor --forming composition--.

Col. 10 (line 58), delete "olored" and insert therefor --underprint a colored--.

Col. 10 (line 59), delete "ition." and insert therefor --leuco dye solution.--

Col. 10 (line 60), after "color", insert --that is visible--.

Col 10 (line 61), delete "uco" and insert therefor --various non-leuco--.

Col. 10 (line 63), delete "olorant" and insert therefor --a non-leuco colorant--.

Col. 10 (line 64), delete "olor." and insert therefor --background color.--

Col. 10 (line 65), delete "rate" and insert therefor --onto the substrate--.

Col. 10 (line 66), delete "olor" and insert therefor --background color--.

Col. 10 (line 67), delete "e" and insert therefor --to the substrate--.

UNITED STATES PATENT AND TRADEMARK OFFICE
CERTIFICATE OF CORRECTION

| | | |
|---|---|---|
| PATENT NO. | : 6,958,181 B1 | |
| APPLICATION NO. | : 10/656735 | |
| DATED | : October 25, 2005 | |
| INVENTOR(S) | : Gore | |

It is certified that error appears in the above-identified patent and that said Letters Patent is hereby corrected as shown below:

In the Specification

Col. 11 (line 1), delete "screen- oating," and insert therefor --screen-printing, spin coating,--.

Col. 11 (line 2), after "applied, insert --and then dried--.

Col. 11 (line 3), after "applied", insert --over the color--.

Col. 11 (line 5), before "ambient", insert --that improved--.

Col. 11 (line 6), after "is", insert --applied to the--.

Col. 11 (line 7), before "additional", insert --Various--.

Col. 11 (line 8), delete "rting" and insert therefor --materials imparting--.

Col. 11 (line 9), delete "etection" and insert therefor --mechanical protection--.

Col. 11 (line 9), delete "an" and insert therefor --compositions can--.

Col. 11 (line 11), delete the entire line which begins with "magnetic…" and insert therefor the following Sub-Heading --Electromagnetic radiation application for development--.

Col. 11 (line 12), before "of", insert --In one embodiment--.

Col. 11 (line 12), delete "n" and insert therefor --compositon can--.

Col. 11 (line 13), delete "n" and insert therefor --using any known--.

Col. 11 (line 14), after "sputtering," insert --spray coating,--.

Col. 11 (line 15), delete "c" and insert therefor --disks, polymeric--.

UNITED STATES PATENT AND TRADEMARK OFFICE
CERTIFICATE OF CORRECTION

PATENT NO. : 6,958,181 B1
APPLICATION NO. : 10/656735
DATED : October 25, 2005
INVENTOR(S) : Gore It is certified that error appears in the above-identified patent and that said Letters Patent is hereby corrected as shown below:

In the Specification

Col. 11 (line 16), delete "e" and insert therefor --embodiment, the--.

Signed and Sealed this

Thirtieth Day of January, 2007

JON W. DUDAS
*Director of the United States Patent and Trademark Office*